Figure 1:
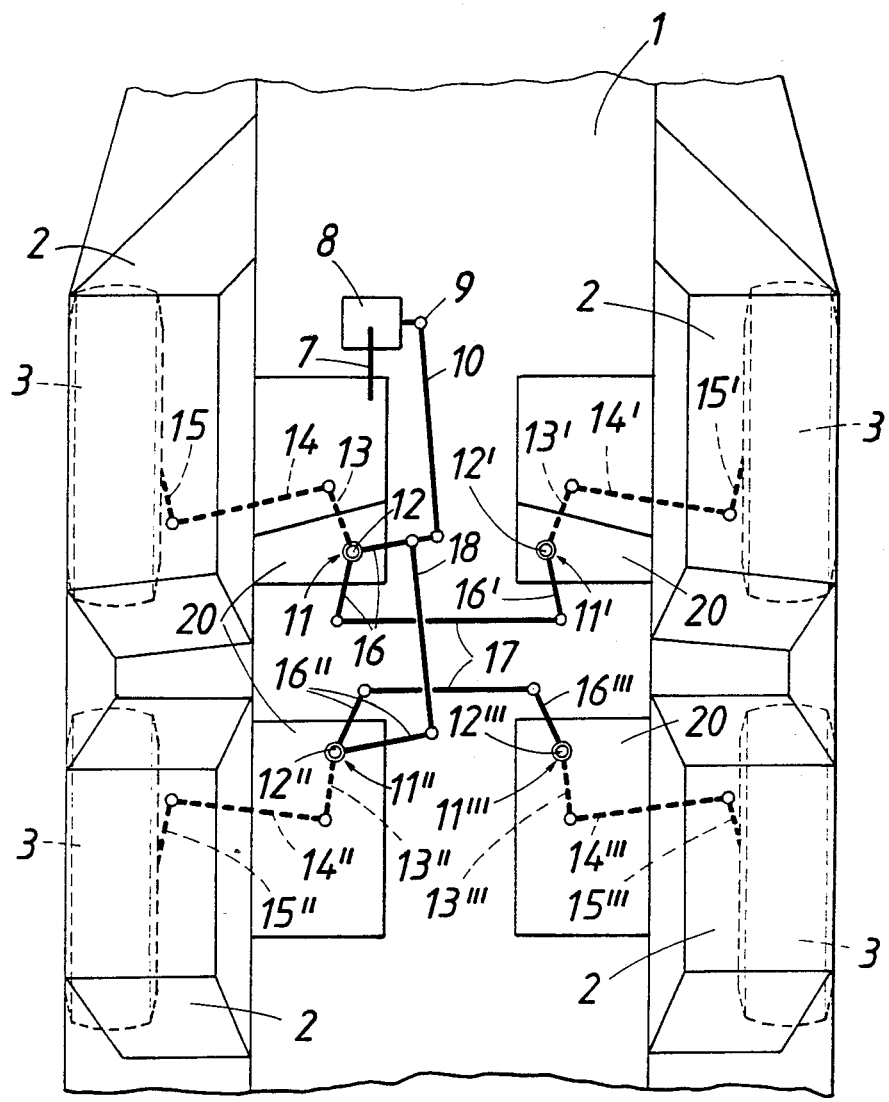

United States Patent [19]
Lenhard-Backhaus et al.

[11] Patent Number: 4,563,015
[45] Date of Patent: Jan. 7, 1986

[54] STEERING MECHANISM MOUNTING ARRANGEMENT

[75] Inventors: Hugo Lenhard-Backhaus, Vienna; Anton Strassgürtl, Schwadorf, both of Austria

[73] Assignee: Steyr-Daimler-Puch Aktiengesellschaft, Vienna, Austria

[21] Appl. No.: 554,263

[22] Filed: Nov. 22, 1983

[30] Foreign Application Priority Data

Dec. 1, 1982 [AT] Austria ................................ 4360/82

[51] Int. Cl.$^4$ ............................................. B62D 7/14
[52] U.S. Cl. ................................. 280/95 A; 114/270; 180/234; 280/99
[58] Field of Search ..................... 280/95 R, 95 A, 91, 280/99, 705; 180/24.01, 234, 236; 114/270

[56] References Cited

U.S. PATENT DOCUMENTS

| | | | |
|---|---|---|---|
| 3,114,348 | 12/1963 | Trippel | 114/270 |
| 3,395,672 | 8/1968 | Ruf | 280/91 |
| 3,825,086 | 7/1974 | Bombardier | 280/95 R |

FOREIGN PATENT DOCUMENTS 940836  1/1974  Canada ............................ 280/95 A Primary Examiner—Joseph F. Peters, Jr.
Assistant Examiner—Kenneth R. Rice
Attorney, Agent, or Firm—Kurt Kelman

[57] ABSTRACT

A motor vehicle comprises a floor pan having stepped portions, and a steerable axle with a pair of steerable wheels suspended from the floor pan adjoining the stepped portions on the outside thereof. The steering mechanism includes a pitman arm, a pair of idler levers having an inner idler arm disposed above the floor pan and an outer idler arm disposed below the floor pan, the idler arms having radially outer portions, the outer portion of the inner idler arm being downwardly offset and the outer portion of the outer idler arm being upwardly offset, a shaft supporting each idler lever and extending through the floor pan, a bearing for each shaft mounted on a respective stepped floor pan portion, a steering rod connected between the pitman arm and one of the idler levers, a centrally disposed tie rod disposed above the floor pan and connecting the inner idler lever arms, a knuckle arm connected to each steerable wheel, and a laterally disposed tie rod connecting the outer idler lever arms to a respective knuckle arm.

1 Claim, 3 Drawing Figures

STEERING MECHANISM MOUNTING ARRANGEMENT

This invention relates to a motor vehicle comprising at least one steerable axle, a floor pan, a plurality of wheels associated with the steerable axle or axles and individually suspended from the floor pan on the outside, and a steering mechanism, comprising a pitman arm, a steering rod connected to the pitman arm, two idler levers, a centrally disposed tie rod connecting the idler levers, two laterally disposed tie rods and two knuckle arms, one of the idler levers extending through the floor pan.

In a known motor vehicle of that kind, only the pitman arm, the steering rod and one idler lever of the steering mechanism are disposed inside the foor pan whereas the shaft of the idler lever extends through the floor pan and the second and/or third idler arm of that idler lever as well as the centrally disposed tie rod connected to the other idler lever are disposed on the outside, under the floor pan. In that case the second idler lever and the laterally disposed tie rods connected to the knuckle arms are also disposed under the floor pan. If the vehicle comprises two steerable axles which are arranged directly behind each other, the entire steering linkage for the second axle and the rod connecting an idler lever of the steering linkage for the forward axle to an idler lever of the steering linkage for the rear axle will also be disposed under the floor pan. Because such motor vehicles are usually suitable for operation off the road, there is a risk that important parts of the steering linkage may be damaged or at least highly soiled. The exposed parts restrict also the ground clearance because they must be arranged under the flat bottom of the pan.

It is an object of the invention to eliminate that disadvantage and to provide a vehicle which is of the kind described first hereinbefore and in which fewer parts of the steering mechanism are susceptible to be damaged or soiled and the ground clearance is improved.

This object is accomplished in accordance with the invention in that the shafts of both idler levers extend to the outside and the central rod is disposed inside the shaft.

Because the shafts of both idler levers extend from the inside to the outside of the pan, i.e., in a downward direction through the pan, only that idler arm of each idler lever which is pivoted to the laterally disposed tie rod must be disposed under the floor pan whereas the other idler arm of each idler lever is disposed above the floor pan so that the centrally disposed tie rod can also be disposed above the pan and that part of the steering linkage which is susceptible to being soiled or damaged because it is disposed under or outside of the floor pan is minimized.

To permit an increase of the ground clearance, the bearings for the shafts of the idler levers are mounted on stepped portions with which the bottom of the pan adjoins the wheel houses and to provide the upper, inner idler arm of each idler lever with a downwardly offset, radially outer portion and the lower, outer idler arm of each idler lever with an upwardly offset, radially outer portion so that the laterally disposed tie rods and the knuckle arms may be disposed on higher levels in the wheel houses and will be more effectively protected.

The arrangement according to the invention will afford special advantages in vehicles having two steerable axles which are disposed directly one behind the other because in that case the idler levers on one side of the vehicles can be coupled by a connecting rod disposed above the pan so that another important part of the steering linkage is disposed inside the floor pan.

An illustrative embodiment of the invention is shown on the drawing, in which

Figure 2:
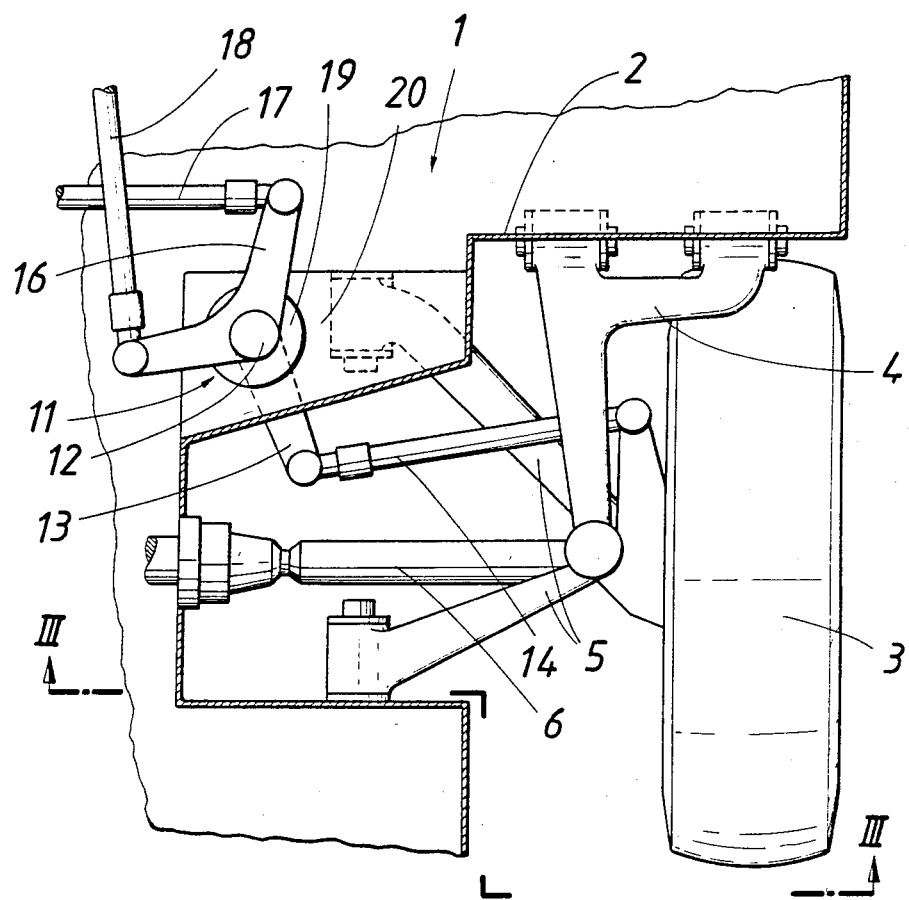
Figure 3:
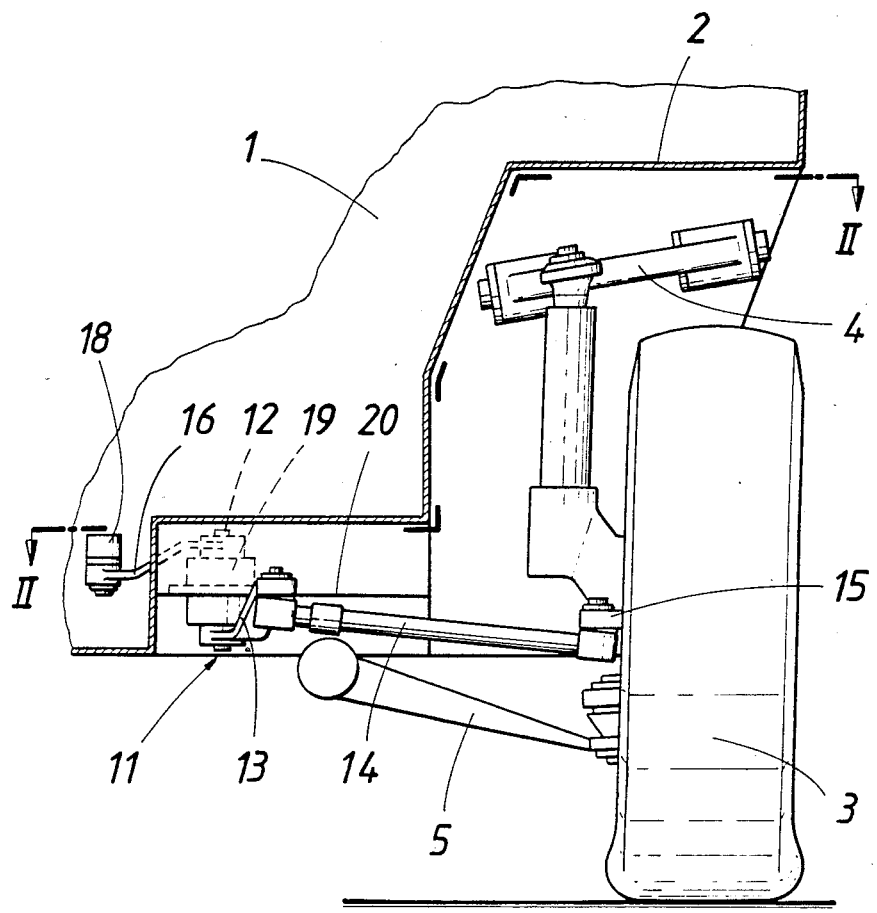

FIG. 1 is a diagrammatic top plan view showing a portion of a cross-country motor vehicle having two steerable axles, FIG. 2 is an enlarged sectional view taken on line II—II in FIG. 3 and showing a detail and FIG. 3 is a corresponding vertical sectional view taken on line III—III in FIG. 2.

The illustrated cross-country motor vehicle comprises a floor pan 1, which is formed with wheel houses 2. Two steerable axles are provided, which are disposed directly behind each other. Inside the wheel houses 2, the wheels 3 associated with the axles are suspended by means of links 4, 5 from the floor pan on the outside thereof. The wheel driving shaft 6 is shown only in FIG. 2, for the sake of clearness.

The entire steering mechanism consists of a steering column 7, which is provided with a steering wheel, not shown, the steering gear 8, which comprises a pitman arm 9, and the steering rod 10, which is connected to the pitman arm 9 and to a three-armed idler lever 11. The shaft 12 of the idler lever 11 extends downwardly, i.e., outwardly, and the lower idler arm 13 of the lever 11 is connected by the laterally disposed tie rod 14 to the knuckle arm 15. Additional idler levers 11', 11" and 11''' are associated with respective additional wheels 3 and have shafts 12', 12" and 12''', which also extend through the floor pan 1 and have lower idler arms 13', 13" and 13''' for transmitting the steering movement by means of the laterally disposed tie rods 14', 14", 14''' to the knuckle arms 15', 15", 15''', respectively, connected to the other wheels 3. The centrally disposed tie rods 17, which connect the inner arms 16, 16' and 16", 16''' of the idler levers 11, 11' and 11", 11''', respectively, and the connecting rod 18, by which the idler levers 11, 11" are coupled, are disposed inside the floor pan 1, as is particularly apparent from FIG. 1. The bearins 19 for the shafts 12, 12', 12", 12''' of the idler levers are mounted on stepped portions 20, with which the bottom of the floor pan adjoins the wheel houses 2. The upper, inner idler arms 16, 16', 16" and 16''' have downwardly offset, radially outer portions. The lower, outer idler arms 13, 13', 13", 13''' have upwardly offset, radially outer portions.

What is claimed is:
1. A motor vehicle comprising
   (a) a floor pan having stepped portions,
   (b) at least one steerable axle and a pair of steerable wheels associated with the steerable axle and suspended from the floor pan adjoining the stepped portions on the outside thereof, and
   (c) a steering mechanism for the pair of steerable wheels including
      (1) a pitman arm,
      (2) a pair of idler levers, each idler lever having an inner idler arm disposed above the floor pan and an outer idler arm disposed below the floor pan, the idler arms having radially outer portions, the outer portion of the inner idler arm being downwardly offset and the outer portion of the outer idler arm being upwardly offset,

(3) a respective shaft supporting each one of the idler levers and extending through the floor pan, (4) a respective bearing for each one of the shafts mounted on a respective one of the stepped floor pan portions, (5) a steering rod connected between the pitman arm and one of the idler levers, (6) a centrally disposed tie rod disposed above the floor pan and connecting the inner idler lever arms, (7) a respective knuckle arm connected to a respective one of the steerable wheels, and (8) a respective laterally disposed tie rod connecting the outer idler lever arms to a respective one of the knuckle arms.

* * * * *